March 16, 1965   R. GILMONT   3,173,298
MANOMETER

Filed Oct. 16, 1961   2 Sheets-Sheet 1

INVENTOR.
ROGER GILMONT
BY James and Franklin
ATTORNEYS

March 16, 1965

R. GILMONT 3,173,298

MANOMETER

Filed Oct. 16, 1961

INVENTOR.
ROGER GILMONT
BY
James and Franklin
ATTORNEYS

United States Patent Office 3,173,298
Patented Mar. 16, 1965

3,173,298
MANOMETER
Roger Gilmont, Douglaston, N.Y., assignor to Roger Gilmont Instruments, Inc., Great Neck, N.Y., a corporation of New York
Filed Oct. 16, 1961, Ser. No. 145,107
2 Claims. (Cl. 73—401)

The present invention relates to a pressure-measuring instrument of the manometer type, and in particular to one specially adapted for the selective measurement of absolute or differential pressure.

Manometric measuring devices are in widespread use for the accurate measurement of pressures, the generic term "pressures" including pressures both above and below atmospheric pressure. In such instruments it is conventional to determine the pressure by measuring the height of a column of liquid contained within a tube. The tube is usually made U-shaped, with the liquid constituting a continuous column in both arms of the tube. For convenience, one of the arms may be made to define a well or reservoir for the liquid, in which case the tube arm in which the column of liquid is adapted to rise when measuring pressure is applied is generally relatively narrow, so that small pressure differences will result in appreciable differences in the height of the liquid, thus facilitating measurement. When differential pressures are to be measured the lower pressure is applied to the upper surface of the liquid in the narrow arm and the lower pressure is applied to the upper surface of the liquid in the other arm. Since the lower pressure is often different from atmospheric pressure, means must be provided for sealing the narrow arm against atmospheric pressure. When absolute pressure is to be measured that portion of the narrow arm above the liquid must be evacuated, and then must be sealed against the entry of all gases. These seals must be highly effective, since any leakage will obviously affect the accuracy in the instrument.

Various proposals have been made in the past for providing such seals. The simplest approach to the problem is to use different instruments for absolute measurement and for differential measurements, each instrument being specially designed for its own particular purpose. However, this results in duplication of equipment. Double-duty instruments, capable selectively of providing for absolute or differential measurements, are in great demand. Because of the different natures of the seals required for absolute and differential measurement respectively, relatively complicated apparatus has resulted, and that complexity has its almost inevitable counterpart in expense, unreliability and susceptibility to damage. In addition, the complex nature or shaping of such convertible instruments as have been known in the past has made it very difficult to clean and assemble them. This is a very significant drawback, since clean instruments are a must in proper laboratory maintenance. The parts of the instrument must periodically be disassembled, cleaned, and reassembled, particularly when the instrument is to be used in the measurement of pressures of different types of gases or in systems containing possible contaminants.

In accordance with the present invention a simple U-tube, each arm of which is straight, is employed for manometric purposes, the construction thereof being so related to the novel sealing apparatus associated therewith as to readily permit the conversion of the device from absolute measurement to differential measurement or vice versa, to provide for highly effective sealing of the device in a manner appropriate to the type of measurement desired, including the provision of a liquid-protected seal for absolute measurement, and at the same time facilitating the disassembly and cleaning of the device.

The narrow or measurement arm of the manometer is straight, and is provided with a pressure inlet port adjacent one end thereof through which pressure may be applied to the upper surface of the liquid contained in that arm or through which the space in that arm above the liquid can be evacuated. The inner surface of the tube arm is provided with upper and lower sealing areas on opposite axial sides respectively of the inlet port. A sealing member is inserted into the narrow tube arm through its open end and carries a pair of axially spaced sealing elements, the member being adjustably axially positionable between upper and lower operative positions. In the upper operative position of the sealing member its upper sealing element engages the upper sealing area, while its lower sealing element is disengaged from the lower sealing area. Hence the pressure inlet port is in communication with the interior of the tube arm proper, so that pressure may be applied to the liquid therein or so that its interior can be evacuated. In the lower operative position of the sealing member the lower sealing element carried thereby is sealingly engaged with the lower sealing area, thus producing a seal between the port and the interior of the tube arm proper. The lower sealing area is preferably located a short distance axially below the inlet port, thus permitting a small amount of the measuring liquid, usually mercury, to be trapped above the lower sealing element when the sealing member is in its lower operative position, the thus trapped mercury reinforcing the seal and ensuring that it will be highly effective even though the sealed interior of the tube arm may be very highly vacuumized. Since the tube arm in question is straight, removal of the sealing member from the open end of the tube arm will expose the entire length of the tube arm for cleaning in a most convenient manner. A simple structure is provided for mounting the sealing member on the open end of the narrow tube arm and for moving it between its operative positions.

To the accomplishment of the above, and to such other objects as may hereinafter appear, the present invention relates to the construction of a manometer, as defined in the appended claims and as described in this specification, taken together with the accompanying drawings, in which:

Figure 1:
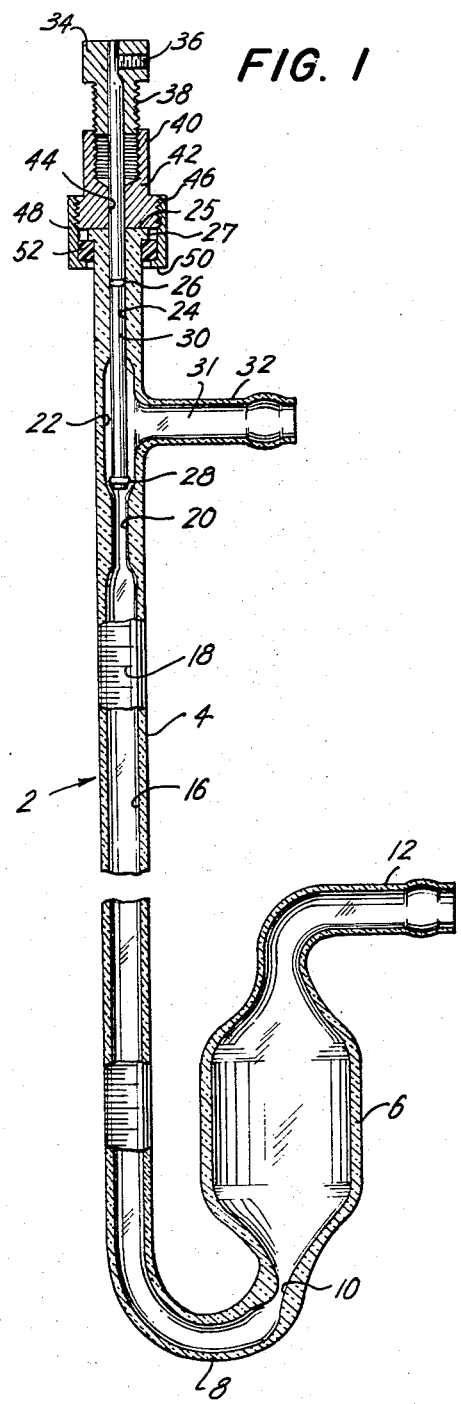
FIG. 1 is a cross sectional view of a preferred embodiment of the present invention, the sealing member being shown in its upper operative position and the manometer being shown empty.
Figure 2:
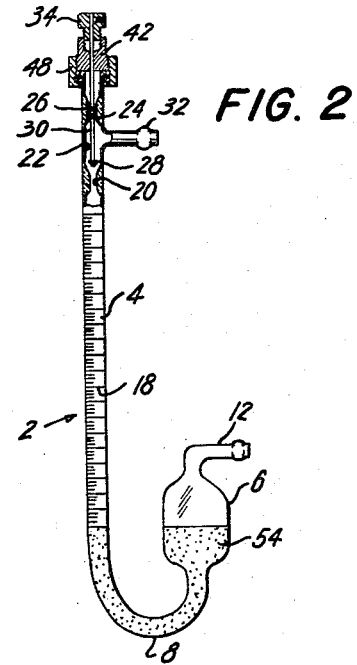
FIG. 2 is a side elevational schematic view on a reduced scale with the upper end thereof shown broken away and partially cross sectioned, illustrating the instrument with measuring liquid therein and ready for measurement.

The instrument comprises a U-shaped tube generally designated 2, formed of glass or other appropriate material, and having a long narrow arm 4 and a short wider arm 6 connected by the U-bend 8, a constriction 10 being provided between the arms 4 and 6. The arm 6 defines a reservoir for the measuring liquid 54. The upper end of the arm 6 is provided with a laterally extending portion 12 defining a pressure inlet port to which external pressure connection is adapted to be made in any desired manner, as through the use of a rubber coupling sleeve 14. The main body of the narrow arm 4 has an internal bore 16 of known relatively small diameter, and is provided along its length with a graduated scale 18, as its conventional. The bore 16 communicates at its upper end with a constricted bore 20, a widened bore 22, and another constricted bore 24 which opens to the upper end 26 of the arm 4, that upper end being provided with a flange 28. A laterally extending portion 32 defines a pressure inlet port which communicates with the widened bore 22 and is preferably located a short but appreciable distance above the narrow bore 20.

A sealing member 30 in the form of a steel rod enters the tube arm 4 via its open upper end 26, and is relatively snugly slidably receivable in the narrow bores 20 and 24. It carries an upper sealing ring 26 and a lower sealing ring 28 axially spaced from one another, those rings being received within grooves formed in the outer periphery of the sealing member 30, as is conventional, and projecting out beyond that outer periphery so as to sealingly engage the inner surfaces of the bores 24 and 20 respectively when received in those bores. The diameter of the widened bore 22 is such that when either of the sealing rings 26, 28 is received therewithin no sealing engagement takes place. The sealing rings 26 and 28 are so axially spaced from one another that when the rod 30 is in an upper position shown in FIGS. 1–5 the sealing ring 26 is received within and sealingly engages the bore 24 and the sealing ring 28 is positioned above and out of engagement with the bore 20, and when the rod 30 is in a lower operative position shown in FIG. 6 the sealing ring 28 is received within and sealingly engages the bore 20. In this lower operative position of the rod 30 the sealing ring 26 may still remain within and sealingly engage the bore 24, but this is not essential.

The upper end of the rod 30, which projects upwardly beyond the end 26 of the tube arm 4, has an adjusting knob 34 secured thereto in any appropriate manner, as by a set screw 36, so as to be rotative therewith. The outer surface of the knob 34 is threaded, at 38, and is received within the internally threaded portion 40 of an adapter 42 which rests upon the upper end 26 of the tube arm 4 and is provided with a central opening 44 through which the rod 30 is slidable. The outer periphery of the adapter 42 is externally threaded, at 46, and is threadedly engaged by a ring 48, that ring having a lower radially inwardly directed flange 50 which engages and compresses a sealing ring 52 between itself and the flange 28 at the top of the tube arm 4. It will therefore be apparent that rotation of the knob 34 will cause the rod 30 to move axially between its upper and lower operative positions as described above.

To assemble the parts of the instrument is exceedingly simple. The ring 48 is slid downwardly over the upper end of the tube arm 4. The sealing ring 52 is sprung into place and the ring 48 is moved upwardly until its upper end extends above the tube top 26. The adapter 42 is screwed into place, compressing the sealing ring 52. The rod 30, with the adjusting knob 34 attached thereto, is slid downwardly through the adapter opening 44 into the bore 24 until the knob 38 engages with the threads 40. The instrument is then in the condition shown in FIG. 1, and is ready for use.

The next step is to fill the instrument with the appropriate amount of measuring liquid 54, such as mercury. This is done while the sealing member 30 is in its upper operative position, so that atmospheric pressure is applied to the upper surface of the measuring liquid 54 in the tube arm 4. The measuring liquid is introduced into the instrument until the meniscus of the liquid 54 in the tube arm 4 is opposite the zero point on the scale 18 (see FIG. 2).

The instrument is now in condition for the measuring of differential pressures. To accomplish this measurement the lower pressure is connected to the pressure inlet port 32 in any appropriate manner, as by the coupling sleeve 14a in FIG. 3, and the higher pressure is connected to the pressure inlet port 12, as by the coupling sleeve 14b. As is conventional, the differences in pressure applied to opposite ends of the column of liquid 54 will cause that liquid to rise within the arm 4, the amount of its rise being proportional to the difference in pressure and being readable on the scale 18. The pressure inlet port 32 will be in fluid communication with the bore 16 via the bore 20, since the lower sealing ring 28 is located above and out of engagement with the bore 20, while atmospheric pressure will be prevented from having any effect on the measurement by reason of the seal between the upper sealing ring 26 and the bore 24.

Figure 4:
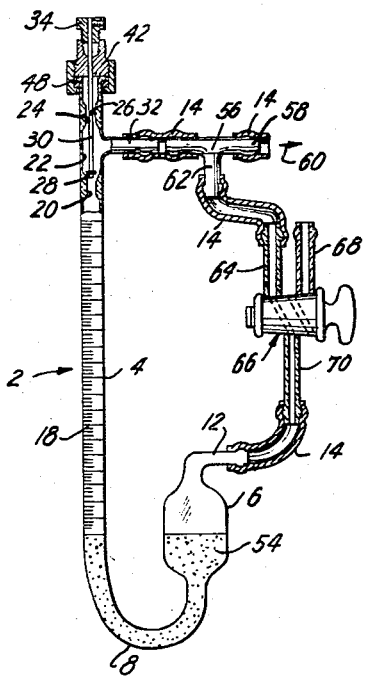
FIG. 4 is a view similar to FIG. 3, and additionally showing certain external connections for conditioning the instrument for absolute pressure measurement.

When the instrument is to be used for absolute pressure measurement the interior of the bore 16 must be evacuated and must thereafter be sealed. To condition the instrument for this type of measurement an arrangement such as shown in FIG. 4 may be used. The pressure inlet port 31 is connected by coupling sleeve 14 to one arm of a T-connection 56 another arm 58 of which is connected to a vacuum pump, as schematically designated by the arrow 60, and a third arm 62 of which is connected to tube 64 forming a part of the stopcock assembly 66. A second tube 68 of the stopcock assembly 66 may be opened to the atmosphere, and a third tube 70 thereof is connected to the pressure inlet port 12 of the manometer unit. The stopcock is of a three-way type, and in FIG. 4 is set to connect the tube 64 and 70 and block the tube 68. Under these circumstances, and with the sealing rod 30 in its upper operative position as shown, it will be apparent that the action of the vacuum pump 60 will evacuate the interior of the tube arm 4 as well as the interior of the tube arm 6 above the level of the liquid 54. This evacuation procedure is continued until all traces of gas and vapor are expelled from the liquid 54. Slight tapping or tilting of the manometer will hasten this process.

Figure 5:
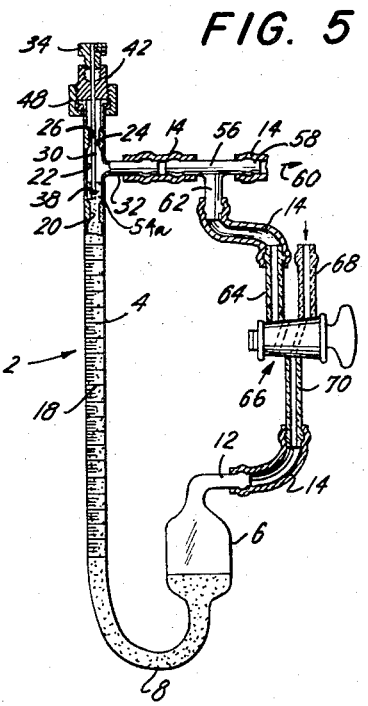
FIG. 5 is a view similar to FIG. 4 but showing a subsequent stage in the conditioning of the instrument for the measurement of absolute pressures.
Figure 6:
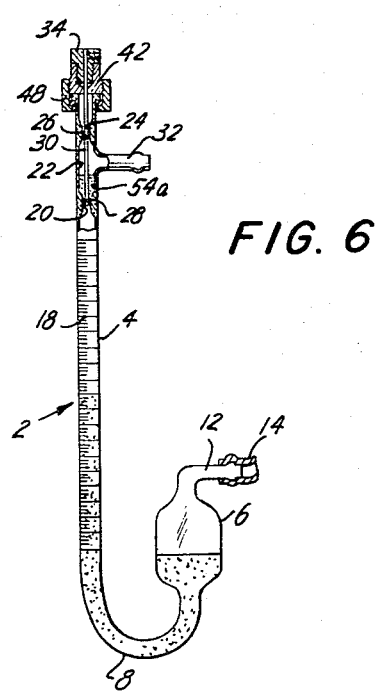
FIG. 6 is a view similar to FIG. 3 but showing the apparatus in use in the measurement of absolute pressure.

After evacuation has proceeded to the desired degree, the stopcock 66 is turned carefully to gradually connect the tubes 68 and 70, while blocking off tube 64, thus admitting air very gradually into the arm 6 (see FIG. 5). The interior of the arm 4 still remains operatively connected to the vacuum pump 60. Consequently the measuring liquid 54 will slowly rise within the arm 4 until, as shown in FIG. 5, it reaches a level above the narrow bore 20, but below the pressure inlet port 32. At this juncture the stopcock 66 should be closed so that no further air can enter the arm 6. Then the sealing rod 30 is moved downwardly to its lower operative position as shown in FIG. 6, in which position the sealing ring 28 enters and makes sealing engagement with the interior of the bore 20, thus sealing the bore 16. Some of the measuring liquid, designated 54a, will be trapped above the sealing ring 28, and the presence of this trapped liquid above the sealing ring 28 will ensure a positive seal. The amount of sealing liquid 54a thus trapped will have a negligible effect on the accuracy of the instrument.

The instrument is now ready for the taking of absolute readings, which may be done by connecting the pressure inlet port 12 to the pressure to be measured. The location of the meniscus of the liquid 54 on the scale 18 will permit direct reading at ambient temperature of the absolute pressure under measurement.

Figure 3:
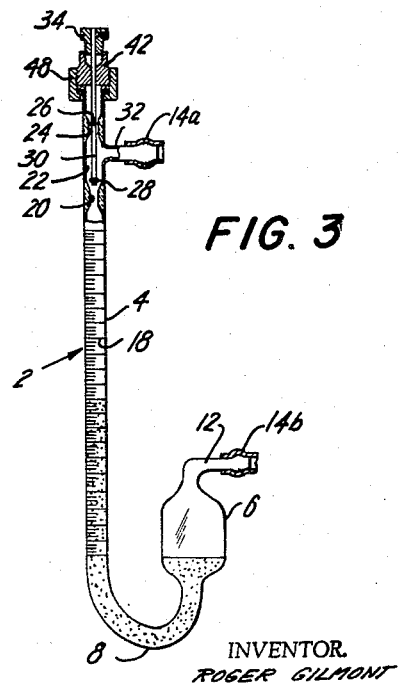
FIG. 3 is a view similar to FIG. 2, but showing the device in use in the measurement of differential pressure.

To reconvert the instrument to differential pressure measurement, all that need be done is to lift the sealing member 30 to its upper operative position. The trapped liquid 54a will flow back into the bore 16, and the instrument will be ready for use as shown in FIG. 3.

When the instrument is to be cleaned the sealing rod 30 is removed from the open end of the arm 4 and the straight length of that arm is then available for cleaning in any appropriate manner, as by the insertion of a cleaning brush thereinto.

It will be appreciated from the above that the construction here involved is exceptionally simple, facilitates assembly, disassembly and cleaning, and permits ready conversion of the instrument from differential pressure measurement to absolute pressure measurement, and in addition provides for a liquid-insured seal when the instrument is adapted for absolute pressure measurement.

While a wall-type manometer is here specifically disclosed, the invention could be used with other types of manometers, such as the equal-arm type. Other variations may be made over the singe embodiment here shown—e.g. the narrow bores 20 and 24 may be of the same inner diameter as the body 16 of the tube, while the intermediate bore 22 has a larger inner diameter—all without departing from the spirit of the invention as defined in the following claims.

I claim:

1. A manometer comprising a tube adapted to receive a supply of liquid, said tube comprising a substantially straight part having a bore and an end, a pressure inlet port in said straight tube part adjacent but axially spaced from said end of said tube and communicating with said bore, a mounting element at said end of said tube part, a member carried by said mounting element and received in the bore of said tube part for axial movement therethrough between upper and lower operative positions and carrying upper and lower axially spaced sealing elements each axially slidable in the bore of said tube, the inner surface of the bore of said tube comprising upper and lower sealing areas on opposite axial sides, respectively, of said inlet port and separated by an intermediate area enlarged in cross section relative to said sealing areas, said member being smaller in cross section than and axially slidably receivable in both of said sealing areas, said sealing elements being compressible, extending out laterally from said member, and adapted to compressibly sealingly engage said sealing areas and to be axially slidable relative thereto, said sealing elements being so located on said member and so positioned relative to said sealing areas that when said member is in its upper operative position said upper sealing element sealingly engages said upper sealing area and said lower sealing element is located above said lower sealing area and out of sealing engagement therewith and with said intermediate area, said lower sealing element sealingly engaging said lower sealing area when said member is in its lower operative position, said end of said tube part having a radially outward projection, said mounting element comprising a first piece operatively engaging the underside of said projection and a second piece operatively engaging the upper side of said end of said tube part and operatively connected to said first piece, said member passing through and threadedly engaging said second piece of said mounting element, said threaded engagement comprising said operative connecting means between said member and said mounting element.

2. The manometer of claim 1, in which said second piece of mounting element extends above said end of said tube part, has a narrow bore therethrough through which said member slidingly passes, and has an enlarged internally threaded bore communicating with said first mentioned bore and open at the upper end of said piece, said member having a part fixed thereto, receivable in said enlarged bore, and there making said threaded engagement with said second piece of said mounting element.

References Cited in the file of this patent

UNITED STATES PATENTS 2,679,759  Gilmont _____ June 1, 1954
2,884,784  Jawett _____ May 5, 1959

OTHER REFERENCES

Nester: A New Type Absolute Manometer Review of Scientific Instruments, vol. 25, No. 11, November 19, 1954, pages 1136, 1137.